March 14, 1944.    R. A. RATCLIFF    2,344,326
TRACTOR MOUNTED IMPLEMENT
Filed Aug. 22, 1942    2 Sheets-Sheet 1

Inventor:
Ralph A. Ratcliff.
By Paul O. Pippel
Atty.

March 14, 1944.　　　R. A. RATCLIFF　　　2,344,326
TRACTOR MOUNTED IMPLEMENT
Filed Aug. 22, 1942　　　2 Sheets-Sheet 2
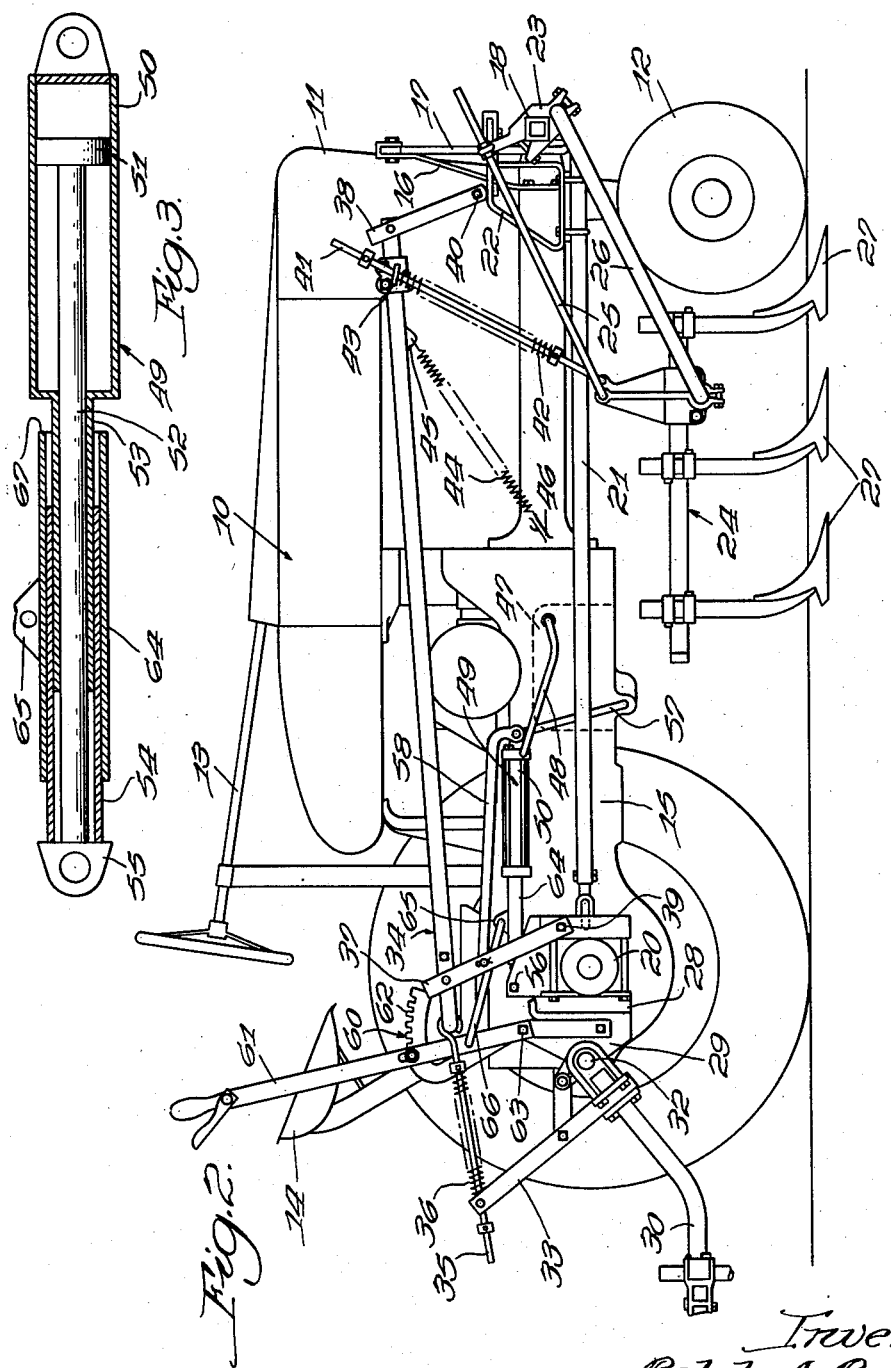
Inventor:
Ralph A. Ratcliff.
By Paul O. Pippel
Atty.

Patented Mar. 14, 1944

2,344,326

UNITED STATES PATENT OFFICE 2,344,326

TRACTOR-MOUNTED IMPLEMENT

Ralph A. Ratcliff, Canton, Ill., assignor to International Harvester Company, a corporation of New Jersey Application August 22, 1942, Serial No. 455,735

5 Claims. (Cl. 97—50)

This invention relates to tractor-mounted implements and more particularly to adjusting arrangements therefor.

It is an object of the present invention to provide a simple arrangement of a power-operated means in connection with working tools mounted on the tractor for vertical movement, whereby the same may be extended always to the full extent without the working tools colliding with the under-body portion of the tractor and at the same time providing a manual adjustable means associated with the power-operated means whereby the working tools may be adjusted in their working position.

It is another object of the invention to provide a simple means for adjusting working tools in their working position and for association with a power-operated means, wherein the working tools will always be brought to the same distance from the body of the tractor regardless of the setting thereof.

According to the present invention, the working tools are lifted from their working position to their transport position by fluid-extensible devices connected to the tractor to react thereagainst and adapted to be extended always the same amount in performing the lifting operation of the working tools. Working tools, vertically alined with the underbody portion of the tractor, will thus always be brought to the same distance from the underbody portion inasmuch as the power devices are connected directly to the tractor.

Each fluid-extensible device includes parts extensible with respect to each other. In order to effect adjustment of the working tools in their ground-working position, there is provided a manually adjustable means adapted to react against the tractor and connected to a sleeve element surrounding the fluid-extensible device and slidable with respect thereto. This adjustable means serves as a stop against which one of the extensible parts will abut as the fluid-extensible device is collapsed to place the working tools in their ground-working position. As the sleeve element is adjusted on the fluid-extensible device, the working tools will be adjusted to have greater or less ground-working depth when in operation.

For other objects and for a better understanding of the invention reference may be had to the following detailed description taken in connection with the accompanying drawings, in which:

Fig. 2 is a view in elevation of the tractor and of the implement and illustrating more clearly the manual adjustable means used for adjusting the tools in their ground-working position; and Figure 3 is an enlarged detail view in section of the power-extensible device showing the extensible parts and a slidable adjusting sleeve mounted on one of these parts.

Figure 1:
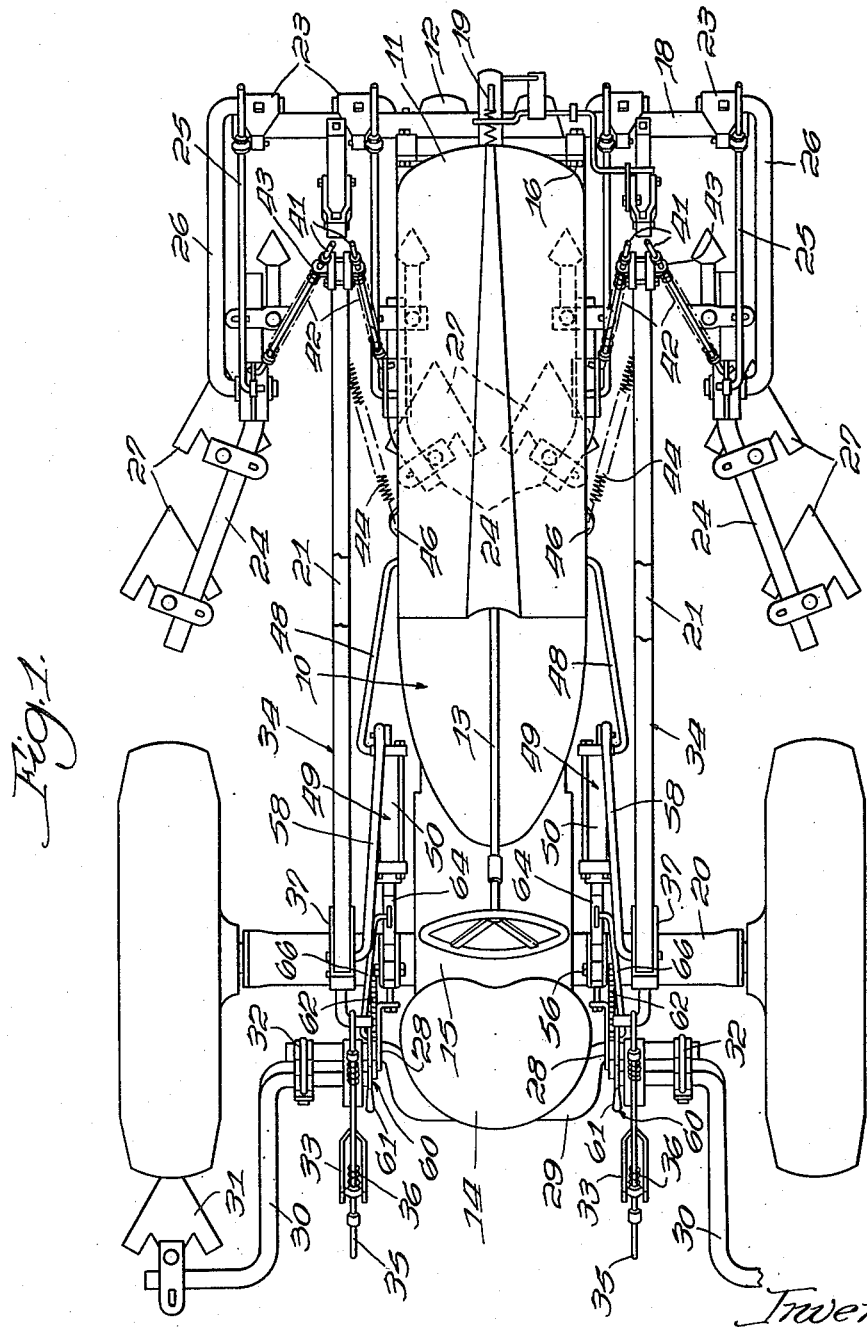
Figure 1 is a plan view of a tractor with an implement attached thereto having the power arrangement embodying the features of the present invention associated therewith.

Referring now to the drawings, there is shown a tractor 10 having a forward portion 11 supported on dirigible wheels 12 adapted to be steered by a steering mechanism 13 accessible to an operator's station 14 on a rear portion 15 of the tractor. The forward portion 12 has a vertically extending bracket structure 16 from which there is suspended, by means of laterally swingable links 17, a transversely extending tool bar 18 of square cross-section. This tool bar is connected to the steering mechanism 13 by a clutch mechanism 19 whereby the tool bar can be moved bodily with respect to the tractor as the dirigible wheels 12 are steered. The rear portion 15 includes a rear axle structure 20 extending laterally on both sides of the tractor and from which extends, respectively, forwardly extending push rods 21 connected by means of bracket structures 22 to the transverse tool bar 18 for the purpose of maintaining the tool bar in its proper forward position and at the same time free to swing in order to permit lateral movement of the tool bar 18.

On the tool bar 18 are brackets 23 to which a working tool 24 is connected by upper and lower parallel links 25 and 26. These parallel links are respectively connected to the tool 24 and to the brackets 23 so that vertical movement of the working tool 24 with respect to the tool bar 18 may be had. The tool bar 18 has connected to it a tool-supporting structure to which working tools 24 are connected for vertical movement. The working tool 24 has shovels 27 on it.

On the rear axle structure 20 of the tractor, at opposite sides thereof, is provided a tool-attaching means 28 which secures to the rear axle 20 a transversely extending bracket structure 29 serving as a means for connecting to the rear portion of the tractor working tools 30 having shovel elements 31 thereon. These working tools are pivoted, as indicated at 32, to the bracket structure 29. On each of the working tools 30 is rigidly connected a vertically extending member 33 adapted to be connected to a fore and aft movable lifting connection 34 by means of a lift rod 35 having a pressure spring device 36 thereon. The lifting connection 34 extending longitudinally of the tractor is supported at its respective ends thereof on fore and aft swingable links 37 and 38. The swingable link 37 is pivoted at 39 to the attaching means 28, while the pivotal lever 38 is pivoted at 40 to the bracket structure 22. The forward tools 24 are connected to the fore and aft movable connection 34 by means of lift rods 41 having spring pressure devices 42 thereon adapted to react against a transversely extending plate 43 on the fore and aft movable connection 34. For the purpose of making the spring pressure devices 42 and 36 effective, there is provided at each side of the tractor and connected with each of the fore and aft movable connections 34 a master spring device 44 connected to a lug 45 on the fore and aft movable connection 34 and to a lug 46 on the tractor.

When it is desired to effect lifting of the working tools out of their ground-working position to their transport position on the tractor, this is effected by a fluid power arrangement including a fluid power source 47 located within the body portion of the tractor and arranged to deliver fluid through hose connections 48 to respective fluid extensible devices 49 located respectively at opposite sides of the tractor.

Referring now particularly to Figure 3, it will be noted that the fluid-extensible devices 49 include a fluid cylinder part 50 and a piston part 51. To this piston part 51 is connected a piston rod 52 slidable through the rearward end of the cylinder structure and through a sleeve 53 protruded from the cylinder structure 50. As a means for connecting the fluid extensible device 49 to the attaching means 28 on the rear axle structure 20 of the tractor, a sleeve 54 is adapted to fit about the sleeve 53 of the fluid cylinder 50. The piston rod 52 abuts against a stop 55 on the rearward end of the sleeve 54, which serves as a means for connecting the sleeve 54 to the attaching means 28 in the manner indicated at 56. The sleeve 54 thus overlaps with the sleeve portion 53 on the cylinder 50. The forward end of the fluid extensible device 49 is supported on a fore and aft swingable link 57 carried by the fluid power reservoir 47. Connection is made between the forward end of the fluid extensible device 49 by means of a connecting link 58 which connects with the fore and aft swingable lever 37 pivoted on the attaching means 28.

Referring particularly to Figure 1, it will be noted that the inner working tools 24 at opposite sides of the tractor are in vertical alinement with the underbody portion of the tractor. The power mechanism and the connections are so arranged that as the fluid-extensible devices 49 are extended to effect lifting of the working tools, the inner working tools 24 will not engage with the underbody portion of the tractor. In other words, the working tool will always come to the same height whenever the power arrangement is operated.

It is common with these power arrangements to have some means by which adjustment of the working tools in their ground-working position may be effected. In other arrangements the power-operated devices have been bodily moved by manually adjustable mechanism, but such arrangements have proven unsatisfactory in that under certain depth adjustments of the working tools, the working tools might strike the underbody portion of the tractor as the fluid-extensible devices are extended to effect lifting of the working tools. Therefore, according to the present invention, a manually adjustable means is provided whereby adjustment of the working tools in their ground-working position may be had but whereby the location or position of the fluid-extensible devices are unaffected.

On the bracket structure 29 there is mounted a manually adjustable mechanism 60 including a lever 61 accessible to the operator's station 14 and adapted to work over a quadrant 62 as the lever pivots about its pivot point 63. Slidably carried on the fluid-extensible device 49 and particularly over the sleeve 54 is a sleeve or stop element 64 having a lug 65 thereon serving for the connection of the sleeve 64 with the lever 61 by means of a connecting link 66. At the forward end of the sleeve 64 is an abutment portion 67 adapted to be engaged by the cylinder part 50 of the fluid-extensible device. To whatever location the sleeve 64 is adjusted, the cylinder 50, as the fluid cylinder device is collapsed with the aid of the master springs 44, will abut the abutment portion 67 of the sleeve 64. The location of the sleeve 64 thus determines the working position of the working tools. The sleeve 64 may be adjusted while the working tools are in their ground-working position or when the fluid-extensible devices are extended. With an arrangement of this nature and of providing the adjustable stop on the fluid-extensible device and adapted to be engaged by one of its parts thereof, there has thus been provided a simple means for adjusting the working tools in their ground-working position without affecting the operation of the fluid-extensible device such as is present when these fluid-extensible devices bodily move to attain adjustment of the working tool.

Upon referring to Figure 1, it will be noted that the arrangements on both sides of the tractor are similar and that the operator has available to him a pair of levers 61, whereby one set of the working tools on one side of the tractor may be adjusted independently of the working tools located at the other side of the tractor.

While various changes may be made in the detail construction, it shall be understood that such changes shall be within the spirit and scope of the present invention as defined by the appended claims.

What is claimed is:

1. In combination, a tool-supporting structure having an underbody portion, a working tool located in vertical alinement with the underbody portion, means for connecting the working tool to the tool-supporting structure for vertical movement from its working position to its transport position on the tool-supporting structure, a power arrangement for lifting the working tool to its transport position and including a power-extensible device connected to the tool-supporting structure to react thereagainst and adapted to be extended the same amount when operated whereby the working tool will be lifted always to within the same distance from the underbody portion, said extensible device including relatively extensible parts, and adjustable stop means including a sleeve slidable on one of said parts and engageable with another of said parts for limiting the amount of collapse of the extensible parts whereby the working position of the working tool may be adjusted.

2. In combination, a tool-supporting structure, a working tool connected to the tool-supporting structure for vertical movement from its working position to its transport position, a power-extensible device for lifting the working tool to its transport position including relatively extensible parts, and means for adjusting the working tool in its working position including a member surrounding one of the parts and slidable thereon adapted to serve as a stop against which another of said parts may abut as the power device is collapsed to return the working tool to its working position.

3. In combination, a tool-supporting structure, a working tool connected to the tool-supporting structure for vertical movement from its working position to its transport position, a power-extensible device for lifting the working tool to its transport position including relatively extensible parts, and manual means for adjusting the working tool in its working position, said adjusting means including a sleeve slidable on one of the parts of the device and adapted to serve as a stop against which another of said parts may abut as the power device is collapsed to return the working tool to its working position.

4. In combination, a tractor having an operator's station, a ground-working tool, means for connecting the ground-working tool to the tractor for vertical movement to and from its ground-working position, a fluid-extensible device for lifting the working tool from its ground-working position, said fluid-extensible device including relatively extensible parts, manually adjustable means accessible to the operator's station for adjusting the depth of the ground-working tool in its ground-working position, said adjustable means including a sleeve adjustably carried on the fluid-extensible device and serving as an abutment against which one of the extensible parts may abut as the fluid-extensible device is collapsed to return the ground-working tool to its ground-working position.

5. In combination, a tractor having an underbody portion, a ground-working tool located in vertical alinement with the underbody portion, means for connecting the ground-working tool to the tractor for vertical movement from a ground-working position to a transport position, a fluid power arrangement for lifting the ground-working tool to its transport position and including a fluid-extensible device connected to the tractor to react thereagainst and adapted to be extended the same amount when operated whereby the ground-working tool will be lifted always to within the same distance from the underbody portion, said fluid-extensible device including parts extensible with respect to each other, manually adjustable stop means for varying the working depth of the ground-working tool connected to the tractor comprising a sleeve slidable on one of said extensible parts adapted to serve as an abutment against which another of said extensible parts may abut as the fluid extensible device is collapsed to return the ground-working tool to its ground-working position.

RALPH A. RATCLIFF.